United States Patent [19]

Ooi et al.

[11] Patent Number: 5,226,129
[45] Date of Patent: Jul. 6, 1993

[54] PROGRAM COUNTER AND INDIRECT ADDRESS CALCULATION SYSTEM WHICH CONCURRENTLY PERFORMS UPDATING OF A PROGRAM COUNTER AND GENERATION OF AN EFFECTIVE ADDRESS

[75] Inventors: Yasushi Ooi; Yoshikuni Sato, both of Tokyo, Japan

[73] Assignee: NEC Corporation, Tokyo, Japan

[21] Appl. No.: 754,314

[22] Filed: Sep. 4, 1991

Related U.S. Application Data

[63] Continuation of Ser. No. 640,558, Jan. 14, 1991, abandoned, which is a continuation of Ser. No. 114,974, Oct. 30, 1987, abandoned.

[30] Foreign Application Priority Data

Oct. 30, 1986 [JP] Japan ............... 61-259866

[51] Int. Cl.⁵ ............... G06F 9/34; G11C 8/00
[52] U.S. Cl. ............... 395/375; 364/255.1; 364/251.3; 364/262.4; 364/DIG. 1; 395/400
[58] Field of Search ... 364/200 MS File, 900 MS File, 364/DIG. 1 MS File, DIG. 2 MS File; 395/375, 400; 365/230.01

[56] References Cited

U.S. PATENT DOCUMENTS

| | | | |
|---|---|---|---|
| 3,728,692 | 4/1973 | Fennel, Jr. | 364/200 |
| 3,840,861 | 10/1974 | Amdahl et al. | 364/200 |
| 4,079,455 | 3/1978 | Ozga | 364/200 |
| 4,236,206 | 11/1980 | Strecker et al. | 364/200 |
| 4,240,139 | 12/1980 | Fukuda et al. | 364/200 |
| 4,255,785 | 3/1981 | Chamberlin | 364/200 |
| 4,315,314 | 2/1982 | Russo | 364/200 |
| 4,677,547 | 6/1987 | Omoda et al. | 364/200 |
| 4,694,391 | 9/1987 | Guttag et al. | 364/200 |
| 4,760,519 | 7/1988 | Papworth et al. | 364/200 |
| 4,777,594 | 10/1988 | Jones et al. | 364/200 |
| 4,819,165 | 4/1989 | Lenoski | 364/200 |

OTHER PUBLICATIONS

"Encyclopedia of Computer Science and Engineering-"-Anthony Ralston, Second Edition, Edwin D. Reilly, Jr. 1982 pp. 1220 and 1221.

Primary Examiner—Michael R. Fleming
Assistant Examiner—Gopal C. Ray
Attorney, Agent, or Firm—Foley & Lardner

[57] ABSTRACT

A processor capable of processing a variable word length instruction has a program counter controlled to indicate the head of an instruction by the value of the program counter. There are provided an adder for summing the length of decoded portions in the variable word length instruction in accordance with the progress of the instruction decoding, and another adder for adding the length of the decoded instruction portions to the program counter so as to update the program counter. Further, there is provided a circuit for calculating an operand effective address by using the value of the program counter in the course of the variable word length instruction decoding. Thus, the updating of the program counter and the generation of the effective address are concurrently executed.

5 Claims, 3 Drawing Sheets

PROGRAM COUNTER AND INDIRECT ADDRESS CALCULATION SYSTEM WHICH CONCURRENTLY PERFORMS UPDATING OF A PROGRAM COUNTER AND GENERATION OF AN EFFECTIVE ADDRESS

This application is a continuation of application Ser. No. 07/640,558, filed Jan. 14, 1991, now abandoned, which is a continuation of application Ser. No. 07/114,974, filed Oct. 30, 1987, now abandoned.

BACKGROUND OF THE INVENTION

1. Filed of the Invention

The present invention relates to a pipelined computer, and more specifically, to a control of a program counter used in a pipelined computer.

2. Description of Related Art

In advanced computers, the architecture has been improved in various points so as to comply with high level languages and a common operation system. Particularly, a relocatable program has been widely used, since standard programs can be placed at any location in an address space. It is very advantageous in such an environment that the same program is used in a plurality of situations.

As a means for easily realizing the relocatable program, there is provided a so-called program counter/-relative addressing mode, which can minimize the modification of a code required to relocate the program. Various central processing units which realize the program counter/relative addressing mode have been already used. As regards the details, reference should be made to, for example, "VAX Architecture Handbook", Digital Equipment Corporation; "MC 68020 User's Manual", Motorola, Inc.; "Z80000 CPU Technical Manual", Zilog; and "NS 32032 Instruction Set Reference Manual", National Semiconductor Corp.

In most of the conventional central processing units having the program counter/relative addressing mode, the architecture adopts a hardware structure processing the instruction decoding and the operand address calculation without distinguishing them from each other. Therefore, it has been ordinary that the value of a program counter at the time of address calculation indicates a head or a tail of one portion of a given instruction which includes the information relating to the address calculation. For example, reference can be made to the program counter/relative addressing mode adopted in the VAX-11 machine of Digital Equipment Corporation. The above referred "VAX Architecture Handbook" shows on page 110 one example of an instruction "MOVE LONG WORD" in the VAX-11 machine. This example is shown in FIG. 3. The address of the first operand is not an instruction head address "00001012$_h$" (the surfix "h" means a hexadecimal notation), but is "00002016$_h$" obtained by adding the displacement "1000$_h$" to the address "00001016" of the tail of a portion including the information concerning the address of the first operand.

In the prior art, in the case of modifying the hardware architecture of the central processing unit so as to improve its performance while maintaining compatibility at the object code level, it has been necessary to quickly obtain the value of the program counter required in calculation of the program counter/relative address, i.e., an intermediate result of the program counter modified in accordance with the progress of the instruction decoding operation. However, an instruction set having a high level function and a plurality of instructions has been heretofore expressed in the form of a variable word length instruction. In addition, the length of the instruction is greatly dependent upon the content of the instruction itself. For example, the length of the instruction is dependent upon:

(11) the number of operands designated by the instruction (0th operand, 1st operand, 2nd operand, . . . );

(2) the addressing information of the operand (additional information such as index modification, displacement, immediate data, etc.);

(3) the encoding of the instruction operand (instructions having a high use frequency are encoded as short as possible).

Japanese Patent Publication No. Sho 59-31733 (Convention Priority: U.S. patent application Ser. No. 854,055 filed Oct. 25, 1977, abandoned, continuation-in-part Ser. No. 954,453, now U.S. Pat. No. 4,236,206 discloses one example of the program counter/relative address calculation in the above mentioned manner of VAX-11. In this example, not only the displacement "1000$_h$" but also one byte defining the operation of an instruction, another byte indicating that the first operand is the program counter/relative addressing, and two bytes showing the displacement for the address calculation of the first operand must be added to the head address "00001012$_h$" of the instruction.

As seen from the above, the fact that the result of the instruction decoding operation is used in the operand address calculation, means that the two kinds operation have a high mutual dependence. In other words, the two kinds of operation have only a small independence from each other. This is one hinderance in increasing a parallel processibility of the two kinds of operations. This inclination is enhanced if there is added a high level function program counter/relative addressing mode such as index.

From a different viewpoint, the increase of the elements to be added for the address calculation is disadvantageous to the variable word length instruction. Particularly, the address calculation of 32 bits or more is inconvenient to a carry transfer control. Specifically, one or more times of calculation are required at the time of the address calculation in order to amend the program counter indicating the head of the current instruction. In this case, a carry must be transferred over a long bit length of 32 bits or more. Therefore, the timing of control is limited since it must wait for the transfer of the carry. In order to overcome this problem, a "carry lookahead" method or a "carry reservation" method can be used for the speed-up the operation. But, an additional hardware resource is necessary for executing such a method, and so, it is expensive.

SUMMARY OF THE INVENTION

Accordingly, it is an object of the present invention to provide a program counter/relative address calculation system which is free from the above mentioned drawback.

Another object of the present invention is to provide a program counter/relative address calculation system capable of executing an instruction decoding and an operand address calculation in parallel in a pipelined processor.

A further object of the present invention is to provide a pipelined processor capable of executing an instruction decoding and an operand address calculation in parallel.

The above and other objects of the present invention are achieved in accordance with the present invention by a processor capable of processing a variable word length instruction and having a program counter controlled to indicate the head of an instruction by the value of the program counter, comprising means for summing the length of decoded portions in the variable word length instruction in accordance with the progress of the instruction decoding, means for adding the length of the decoded instruction portions to the program counter so as to update the program counter, and means for generating a program counter relative operand effective address by using the value of the program counter in the course of the variable word length instruction decoding, so that the updating of the program counter and the generation of the effective address are concurrently executed.

With the above arrangement, the means for updating the program counter for a next instruction and the means for executing the effective address calculation are provided independently of each other, and therefore, can be controlled independently of each other. In addition, in the process of the effective address calculation, the effective address calculation means can use the value of the program counter before the program counter is updated to the address of the next instruction. Accordingly, the updating of the program counter and the effective address calculation can be concurrently executed, so that the degree of a parallel processing for instruction decoding can be increased.

In a preferred embodiment, there is provided an adder used only for offsetting the program counter. In this case, the number or time of long bit data addition made directly to the program counter can be decreased. Thus, it is possible to enhance the performance of individual operations in the processor.

The above and other objects, features and advantages of the present invention will be apparent from the following description of the preferred embodiment of the invention with reference to the accompanying drawings.

DESCRIPTION OF THE PREFERRED EMBODIMENT

Figure 1:
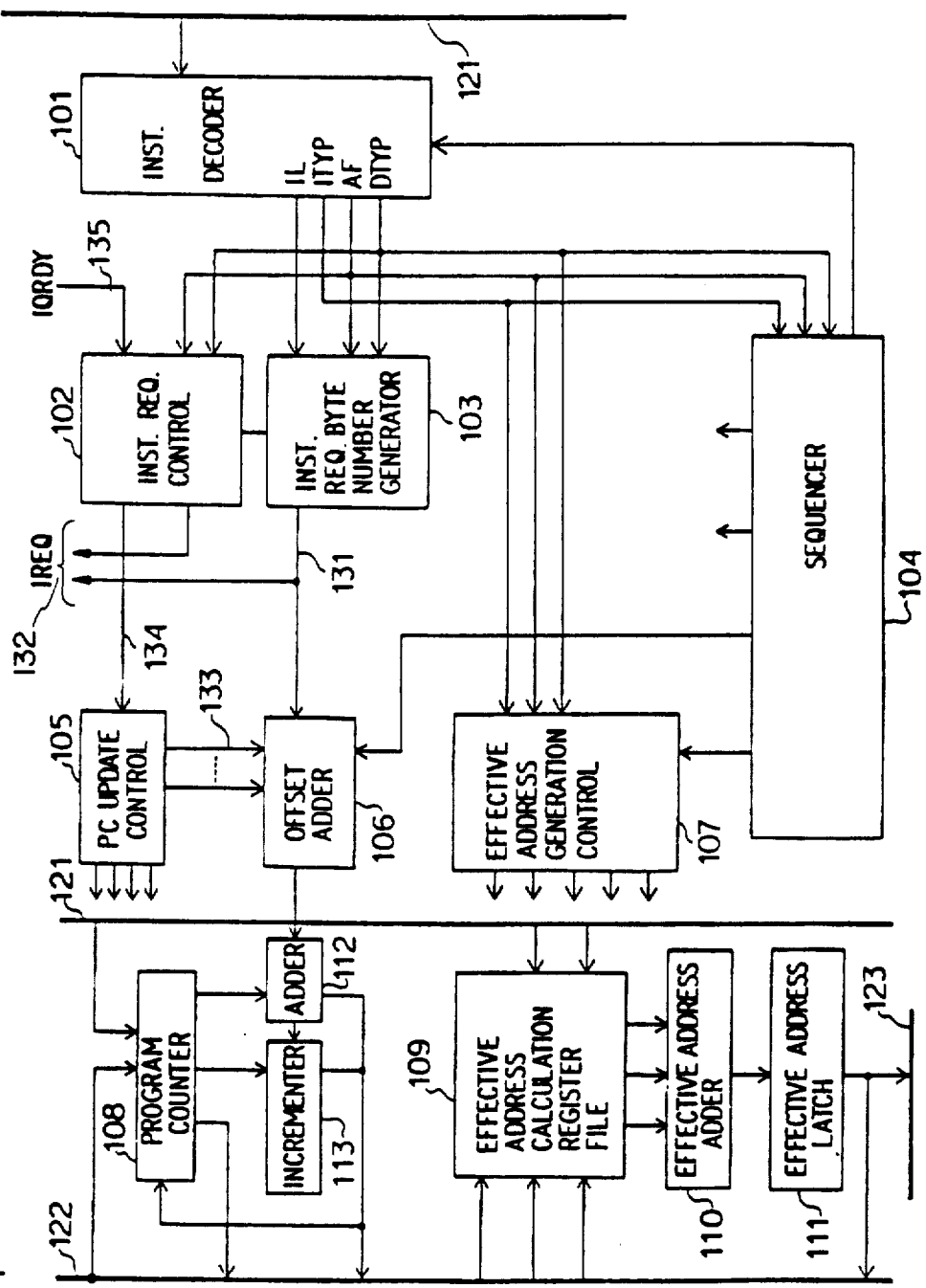
FIG. 1 is a block diagram of one embodiment of the address calculation system in accordance with the present invention.
Figure 2:
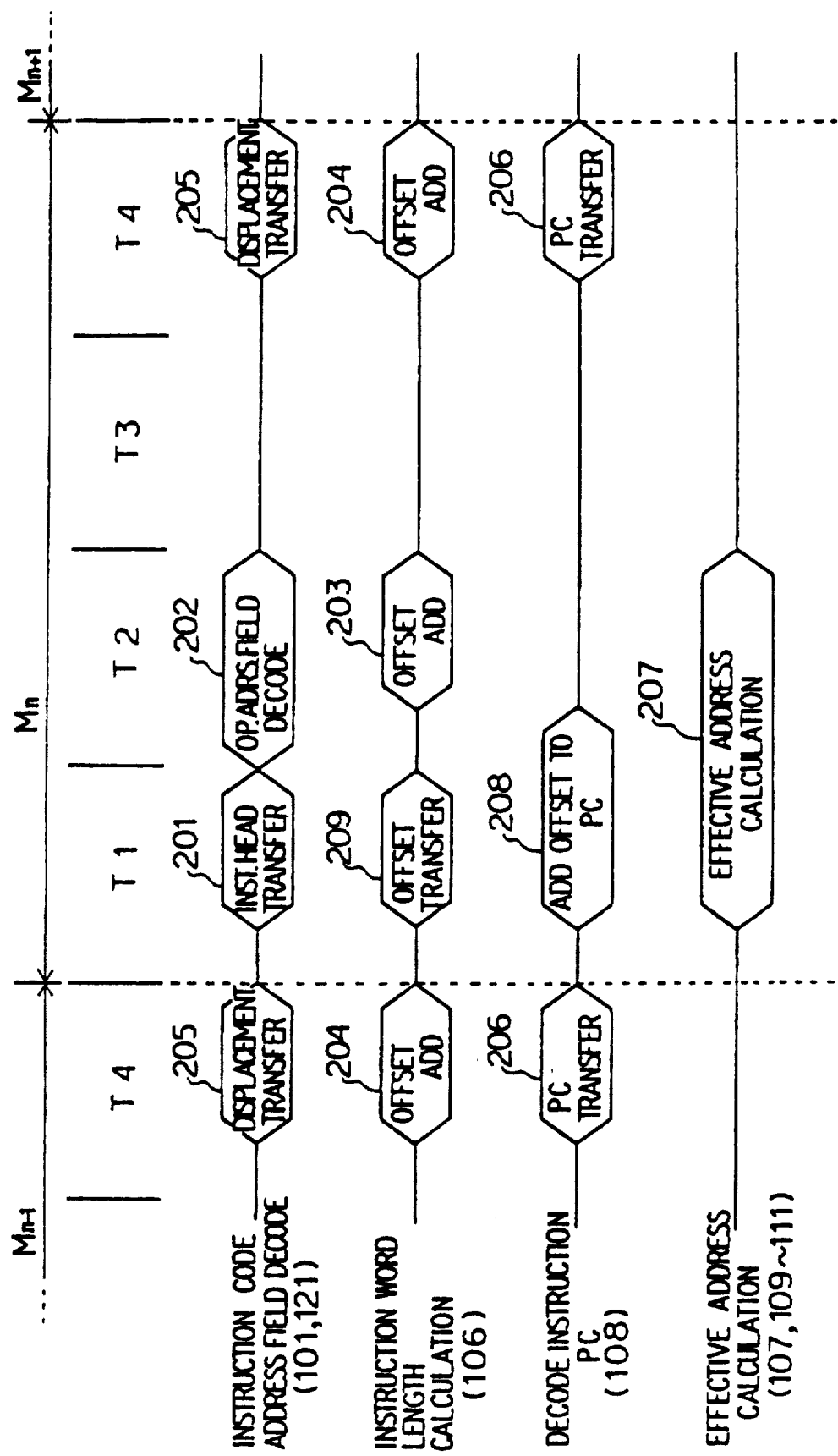
FIG. 2 is a timing chart illustrating an operation of the system shown in FIG. 1.
Figure 3:
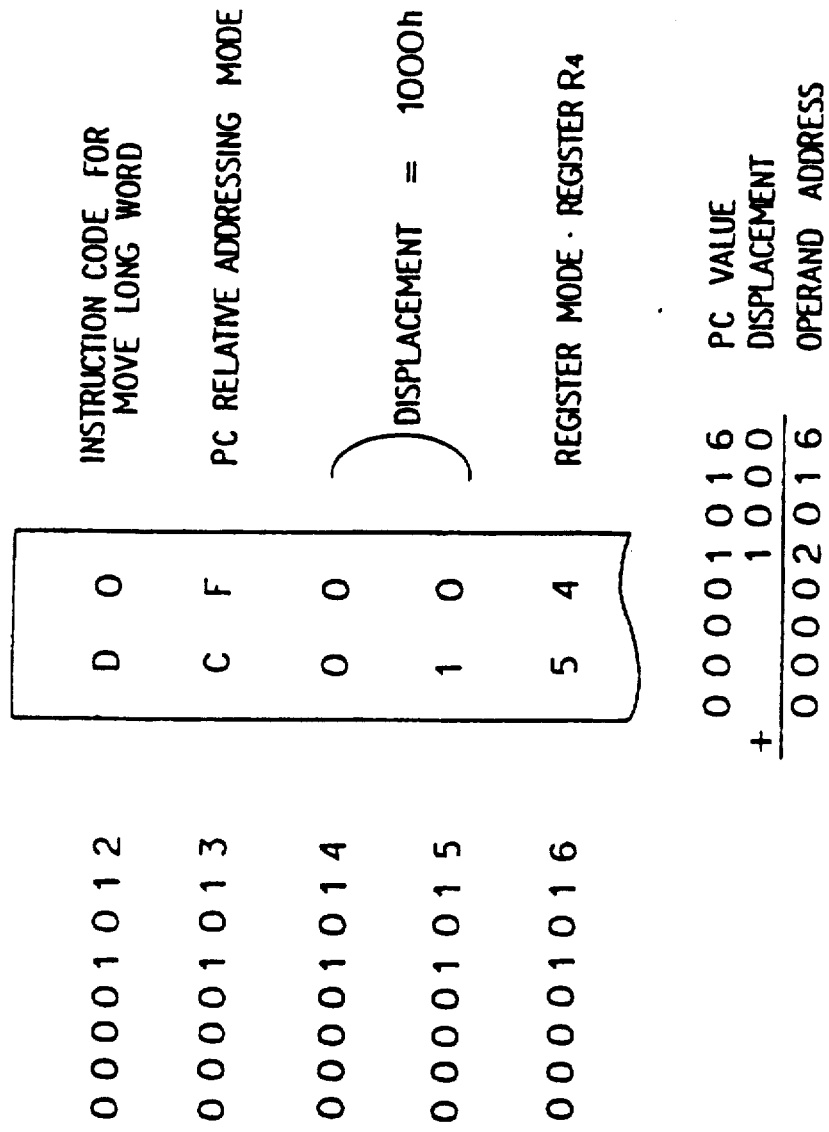
FIG. 3 illustrates one calculation example of the conventional program counter/relative addressing.

Referring to FIG. 1, there is shown one embodiment of the program count/relative address calculation system in accordance with the present invention. FIG. 2 illustrates the timing chart for one operation example of the system. In FIG. 2, there are shown three cycles $M_{n-1}$, $M_n$ and $M_{n+1}$, each cycle being divided into four timing intervals T1, T2, T3 and T4.

The shown system includes an instruction decoder 101 coupled to an instruction bus 121 and controlled by a sequence controller 104 for instruction decoding, which also controls the operation timing of other various elements contained in the system. The decoder 101 receives an instruction from the bus 121 at a timing T1 (201) of each cycle shown in FIG. 2 and decodes an instruction code and an address field contained in the received instruction at a timing T2 (202) of each cycle. Then, the decoder 101 generates an instruction code length IL, an instruction type ITYP, an address field information AF, and an operand data type DTYP. The instruction code length IL is notified to an instruction request byte number generator 103, and the instruction type ITYP is informed to the sequence controller 104 and an effective address generation controller 107. The address field information AF and the operand data type DTYP are supplied to an instruction request controller 102, the sequence controller 104 and the effective address generation controller 107. As the result of the decoding, for example, IL indicates that the instruction code length is one byte, and ITYP show that a given instruction is an operation instruction having two operands. AF indicates that a first operand has the program counter/relative addressing mode having a displacement of 16 bytes, and a second operand indicates the register. DTYP shows the data length of 32 bits.

The instruction request byte number generator 103 calculates the byte number of an instruction word required in the next decoding cycle, on the basis of the decoded result of the whole or a first one portion of the given instruction word given by the decoder 101. But, this byte number depends upon the instruction length which can be decoded by the decoder 101 at one decoding cycle. In this embodiment, the decoder 101 has a sufficient decoding capacity to decode at one decoding cycle all the contents of IL, ITYP, AF and DTYP, excluding some exceptional cases. The instruction request byte number generator 103 is controlled by the instruction request controller 102 and supplies from its output 131 the byte number data, which is inputted to the program counter offset adder 106. The output 131 of the instruction request byte number generator 103 and an output 132 of the instruction request controller 102 constitute together an instruction request signal IREQ. Specifically, the outputs 131 and 132 form an interface signal for an instruction queue having an alignment ability.

The instruction request controller 102 has another output 134 coupled to a program counter update controller 105. The offset adder 106 is reset at the timing T1 (209) and added with the output 131 at the timing T2 (203). This operation of the offset adder 106 is controlled by the update controller 105 through control lines 133. The operation of the update controller 105 is controlled by the output 134 of the instruction request controller 102. Particularly, the update controller 105 modifies the offset adder 106 when in the preceding decoding cycle the instruction word length is smaller than the length which can be decoded at the current decoding cycle.

The shown system also includes a program counter 108 for instruction decoding, which is coupled to the instruction bus 121 and an effective address calculation bus 122. The program counter 108 is associated with an adder 112 and an incrementer 113 coupled as shown. The shown system further includes a register file 109 for effective address calculation coupled to the instruction bus 121 and the effective address calculation bus 122. The register file 109 is also coupled at its output to an effective address adder 110, which is coupled to an effective address latch 111. This latch is coupled to the bus 122 and an operand address bus 123.

Operation will be now explained with reference to the timing chart shown in FIG. 2.

If an instruction can be obtained from the instruction queue in response to the outputs 131 and 132 (IREQ), an instruction queue ready IQRDY is inputted to the instruction request controller 102. In the operation example shown in FIG. 2, it is assumed that at a second decoding cycle T3, the decoding is not carried out, and a displacement for effective address calculation is then fed on the instruction bus 121 at a timing T4 (205). Whether or not this displacement transfer (205) should be executed is discriminated by the sequence controller 104 and the effective address generation controller 107 on the basis of the decoded information (IL, ITYP, AF, DTYP). Further, at the timing T4 (204), the output 131 is added in the offset adder 106.

As mentioned above, if the addressing mode of the operand is the program counter/relative addressing, the effective address generation controller 107 causes the content (the displacement data) of the instruction bus 121 to be latched to one register of the effective address calculation register file 109, as shown in 205, and at the same time, the value of the program counter 108 to be outputted to the effective address calculation bus 122 so that the value is latched to another register of the register file 109, shown 206. Subsequentially, as shown by 207, the address calculation is started from the timing T1 by the address adder 110 on the above mentioned two latched data. At the same time, as shown by 209, the offset adder 106 outputs the summed value of the instruction length for the current instruction to the adder 112 associated with the program counter 108, so that the program counter 108 is updated by the incrementer 113 and the adder 112 under the control of the update controller 105, as shown by 208.

Accordingly, there are concurrently executed in the cycle $M_n$ the effective address calculation on the basis of the instruction decoded in the preceding cycle $M_{n-1}$ and the updating of the program counter on the basis of the output of the program counter offset adder.

The invention has thus been shown and described with reference to the specific embodiment. However, it should be noted that the invention is in no way limited to the details of the illustrated structures but changes and modifications may be made within the scope of the appended claims.

We claim:

1. A processor including an instruction decoder receiving an instruction of a variable word length for generating a decoded instruction, and a program counter for indicating an instruction address to be read, said processor allowing a program to be located at any desired location within an address space and also allowing addressing a program with a relative reference to a value of said program counter, said processor comprising:
   first means for receiving said decoded instruction from said instruction decoder and for summing respective lengths of decoded portions of said instruction of variable word length as instruction decoding proceeds, said first means outputting a total length of said decoded portions of said instruction of variable word length;
   second means for receiving said total length outputted from said first means and for adding said total length of said decoded portions to a value of said program counter to update said program counter;
   third means for receiving said value of said program counter to execute an effective address calculation, using said value of said program counter as it existed before said updating of said program counter, for a next instruction; and
   fourth means, coupled to receive decoded information from said instruction decoder and also coupled to said second means and to said third means, for independently controlling said second means and said third means.

2. A processor comprising:
   a program counter coupled to a first bus through which an instruction is supplied and a second bus through which an effective address is supplied, said program counter associated with a first adder for updating a content of said program counter;
   a register file coupled to said first bus and to said second bus for operatively latching a displacement on said first bus and a value of said program counter supplied on said second bus;
   an effective address calculation adder coupled to said register file to produce a sum of said displacement and said value of said program counter as a calculated effective address;
   an effective address latch coupled to said effective address calculation adder for outputting a calculated effective address to said second bus;
   an instruction decoder coupled to said first bus for generating decoded data;
   an instruction request controller coupled to receive said decoded data;
   an instruction request total byte number generator, coupled to receive said decoded data, to generated total byte number information;
   a program counter update controller controlled by said instruction request controller to control updating of said program counter;
   a program counter offset supplying means, coupled to said instruction request total byte number generator and to said program counter update controller, to supply an offset value to said first adder associated with said program counter;
   an effective address generation controller, coupled to receive said decoded data, for controlling said register file and said effective address calculation adder; and
   a sequencer for enabling said program counter update controller and said effective address generation controller simultaneously such that updating of said program counter and generation of said effective address are concurrently executed.

3. A processor for processing an instruction of a variable word length, said processor including an instruction decoder receiving said instruction of variable word length for generating a decoded instruction, and a program counter controlled to indicate a beginning of an instruction to be decoded by a value of said program counter, said processor allowing a program to be located at any desired location within an address space and also allowing addressing a program with a relative reference to said value of said program counter, said processor comprising:
   first means for receiving said decoded instruction from said instruction decoder and for summing respective lengths of decoded portions of said instruction of variable word length as instruction decoding proceeds, said first means outputting a total length of said decoded portions of said instruction of variable word length;

second means, coupled to said program counter, for receiving said total length outputted from said first means and for supplying and adding said total length of said decoded portions to a value of said program counter so as to update said program counter after a decoding of said instruction of variable word length;

third means for receiving said value of said program counter as it exists prior to said updating by said second means and a relative address information portion of said decoded instruction and for generating a sum of said value of said program counter as it exists prior to said updating by said second means and said relative address information portion as a program counter relative operand effective address in the course of said decoding of said instruction of variable word length; and a control unit for enabling said second means and said third means simultaneously so that updating of said program counter and generation of said effective address based on an original value of said program counter are concurrently executed.

4. A processor claimed in claim 3 wherein said third means is connected to receive said value of said program counter and displacement information included in said decoded instruction and operates to add said displacement information to said value of said program counter for generating said program counter relative operand effective address.

5. A processor claimed in claim 3 further including an adder coupled to said program counter only for offsetting said program counter so that the number or time of long bit data addition made directly to said program counter can be decreased.

* * * * *